United States Patent
Kim et al.

(10) Patent No.: US 8,605,595 B2
(45) Date of Patent: Dec. 10, 2013

(54) METHOD AND APPARATUS FOR TRANSMITTING AND RECEIVING DATA USING MULTIPLE ACCESS LINKS

(75) Inventors: Yun-Joo Kim, Gyeonggi-do (KR); Jong-Ee Oh, Daejeon (KR); Sok-Kyu Lee, Daejeon (KR)

(73) Assignee: Electronics and Telecommunication Research Institute, Daejon (KR)

( * ) Notice: Subject to any disclaimer, the term of this patent is extended or adjusted under 35 U.S.C. 154(b) by 172 days.

(21) Appl. No.: 12/688,048

(22) Filed: Jan. 15, 2010

(65) Prior Publication Data

US 2010/0177656 A1 Jul. 15, 2010

(30) Foreign Application Priority Data

Jan. 15, 2009 (KR) .................. 10-2009-0003486

(51) Int. Cl.
*H04L 12/28* (2006.01)

(52) U.S. Cl.
USPC ......................................................... 370/236

(58) Field of Classification Search
USPC ......... 370/229, 235, 236, 241, 252, 310, 312, 370/328, 338, 464, 230, 232, 329, 351, 370/908; 455/403, 422.1, 423, 39, 67.11, 455/500, 507, 509, 513, 91, 115.1, 115.3, 455/130, 226.1, 226.2, 226.3
See application file for complete search history.

(56) References Cited

U.S. PATENT DOCUMENTS

| | | | |
|---|---|---|---|
| 2004/0102194 A1* | 5/2004 | Naghian et al. | 455/436 |
| 2004/0264394 A1* | 12/2004 | Ginzburg et al. | 370/310 |
| 2005/0078624 A1 | 4/2005 | Shu et al. | |
| 2006/0019663 A1* | 1/2006 | Cuffaro et al. | 455/436 |
| 2006/0221919 A1* | 10/2006 | McRae et al. | 370/338 |
| 2007/0047492 A1* | 3/2007 | Kim et al. | 370/331 |
| 2008/0089276 A1* | 4/2008 | Ito et al. | 370/328 |

FOREIGN PATENT DOCUMENTS

| | | | |
|---|---|---|---|
| KR | 1020040016665 A | 2/2004 |
| KR | 1020060106775 A | 10/2006 |
| KR | 1020080052111 A | 6/2008 |
| KR | 1020090013180 A | 2/2009 |

* cited by examiner

*Primary Examiner* — Omar Ghowrwal
(74) *Attorney, Agent, or Firm* — Ladas & Parry LLP

(57) ABSTRACT

A data receiving method in a wireless LAN system using multiple channels includes: determining whether a difference value of signal levels of first and second access points is equal to or less than a preset value; transmitting an association request frame to the first and second access points according to the determination result; and receiving association response frames from the first and second access points.

11 Claims, 5 Drawing Sheets

METHOD AND APPARATUS FOR TRANSMITTING AND RECEIVING DATA USING MULTIPLE ACCESS LINKS

CROSS-REFERENCE(S) TO RELATED APPLICATIONS

The present application claims priority of Korean Patent Application No. 10-2009-0003486, filed on Jan. 15, 2009, which is incorporated herein by reference in its entirety.

BACKGROUND OF THE INVENTION

1. Field of the Invention

Exemplary embodiments of the present invention relate to a data receiving method; and, more particularly, to a data receiving method of a wireless station in a wireless LAN system using multiple channels.

2. Description of Related Art

Internet users have rapidly increased, and in particular, wireless LAN Internet users are increasing. A wireless LAN service is a service which provides an existing short-range wired communication service, i.e., a wired LAN service, by using a wireless medium as a data transmission medium. The Institute of Electrical and Electronics Engineers (IEEE) 802.11 Infrastructure scheme has been widely used as a wireless communication method. Wireless LAN technology has evolved into the IEEE 802.11n, which increases the data rate from the conventional level of tens of Mbps up to 600 Mbps.

A wireless LAN service enables a wireless station (STA), such as a notebook computer or a personal digital assistant (PDA), to receive a variety of services, e.g., a wireless Internet service, by using an access point which functions as a wired/wireless gateway. Specifically, a medium access control (MAC) protocol of a wireless LAN defined in the IEEE 802.11 basically supports a Basic Service Set (BSS) constituted by a wireless station and an access point which functions as an association point of a distributed system. The access point performs a function similar to a LAN hub. A single access point may provide a service to wireless stations placed in a preset service area. The service area refers to an area where the access point can provide a service to the wireless stations.

Recently, as wireless LAN users are rapidly increasing, there is a growing need for increasing data throughput which is provided in a single BSS, i.e., a wireless LAN system. To this end, much study has been conducted on systems which provide a wireless LAN service through multiple channels.

SUMMARY OF THE INVENTION

An embodiment of the present invention is directed to a data receiving method in a wireless LAN system using multiple channels, which is capable of providing a high-throughput wireless LAN service having an improved quality of service (QoS).

Another embodiment of the present invention is directed to a data receiving method in a wireless LAN system using multiple channels, which is capable of providing a seamless wireless LAN service.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a data receiving method in a wireless LAN system using multiple channels includes: determining whether a difference value of signal levels of first and second access points is equal to or less than a preset value; transmitting an association request frame to the first and second access points according to the determination result; and receiving association response frames from the first and second access points.

In accordance with another embodiment of the present invention, a data receiving method in a wireless LAN system using multiple channels includes: receiving a first association response frame from a first access point having received a first association request frame; determining whether a difference value of signal levels of the first and second access points is equal to or less than a preset value; transmitting a second association request frame to the second access point according to the determination result; and receiving a second association response frame from the second access point.

DESCRIPTION OF SPECIFIC EMBODIMENTS

Figure 1:
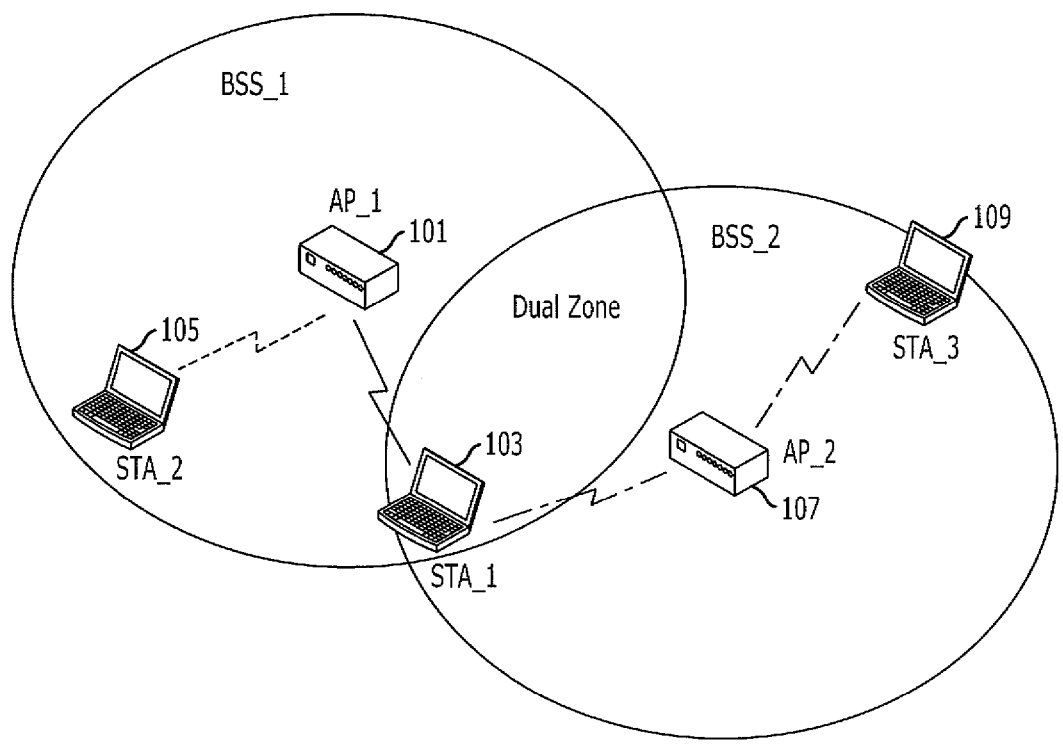
FIG. 1 illustrates a wireless LAN system using multiple channels in accordance with an embodiment of the present invention.

In order to guarantee a higher data rate than the above-described IEEE. 802.11n, a Task Group (TGac) has been created within the IEEE 802.11 Working Group (WG) to study next generation wireless LAN technology and is in the process of establishing a new standard to enable Gbps-level data transmission. For reference, the IEEE 802.11a/b/g standard and the IEEE 802.11n standard are referred to as a legacy mode and a High Throughput (HT) mode, respectively. In addition, the standard newly discussed in IEEE 802.11ac is referred to as a Very High Throughput (VHT) mode. Much study has been conducted on methods which simultaneously provide a wireless LAN service to a plurality of wireless stations through multiple channels in the IEEE.802.11ac.

An access point and a wireless station included in a single BSS transmit/receive data in accordance with a Carrier Sense Multiple Access with Collision Avoidance (CSMA/CA) protocol. A handover or handoff is performed in order to provide a seamless wireless LAN service, even when a wireless station is moving. Specifically, when a signal transmitted from a first access point of a first BSS becomes weak, a wireless station may perform a handover to a second access point of a second BSS and receive a wireless LAN service from the second access point. At this time, a wireless LAN service may be interrupted when the handover is delayed or failed.

Exemplary embodiments of the present invention relate to methods which allow a VHT wireless station to receive data from a plurality of access points in a wireless LAN system, i.e., a Multiple Channel Basic Service Set (MUCH-BSS). In accordance with the exemplary embodiments of the present invention, a seamless wireless LAN service may be provided by allowing a wireless station to receive data from a plurality of access points included in a plurality of BSSs. For example, even when a wireless station associated with a first access point moves and thus a signal transmitted from the first access point becomes weak, a seamless wireless LAN service is provided because the wireless station can receive data from a second access point.

And in accordance with the exemplary embodiments of the present invention, a wireless station can receive data of very high Throughput form access point because the wireless station can receive data a plurality of access points Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 illustrates a wireless LAN system using multiple channels in accordance with an embodiment of the present invention.

Referring to FIG. 1, a wireless LAN system in accordance with an embodiment of the present invention includes a first access point 101, a first wireless station 103, a second wireless station 105, a second access point 107, and a third wireless station 109. The first access point 101, the first wireless station 103, and the second wireless station 105 constitute a first BSS BSS_1. The second access point 107, the first wireless station 103, and the third wireless station 109 constitute a second BSS BSS_2. The first wireless station 103, the first access point 101, and the second access point 107 may be a VHT wireless station and VHT access points which support multiple channels. The second wireless station 105 and the third wireless station 109 may be VHT wireless stations or non-VHT wireless stations.

The first to third wireless stations 103, 105 and 109 are associated with the first and second access points 101 and 107 and receive data from the first and second access points 101 and 107, based on an IEEE 802.11 MAC protocol. In accordance with the embodiment of the present invention, however, the first wireless station 103 is associated with both the first and second access points 101 and 107 and receives data from both the first and second access points 101 and 107. The first wireless station 103 may be simultaneously associated with the first and second access points 101 and 107, or may be associated with the first access point 101 and then associated with the second access point 107.

As illustrated in FIG. 1, the first wireless station 103 is located in a dual zone in which a difference value of signal levels transmitted from the first and second access points 101 and 107 is equal to or less than a preset value. The first wireless station 103 determines whether the difference value of the signal levels transmitted from the first and second access points 101 and 107 is equal to or less than the preset value. When it is determined that the difference value of the signal levels transmitted from the first and second access points 101 and 107 is equal to or less than the preset value, the first wireless station 103 determines that it is located at the dual zone, and requests an association with the first and second access points 101 and 107.

As described above, since the difference value of the signals levels transmitted from the first and second access points 101 and 107 is equal to or less than a preset value in the dual zone, interference between the signals is not great. Hence, the first wireless station 103 may receive data from both the first and second access points 101 and 107. The first wireless station 103 may receive the signals of the first and second access points 101 and 107, and determine the difference value of the signal levels of the first and second access points 101 and 107 from channel information, e.g., received signal strength indication (RSSI) or signal-to-noise ratio (SNR), and determine whether it is located at the dual zone.

Numerical conditions for the dual zone may be different depending on wireless environments. Also, kinds of services the VHT wireless station wants may be different depending on characteristics of the dual zone. Since the construction of the multiple channels between the VHT wireless station and the access point is changed depending on characteristics of the wireless station or service characteristics requested by the wireless station, the number of multiple wireless channels and kinds of services supported based on them may be different.

Furthermore, in view of an available bandwidth, the wireless apparatus in accordance with the embodiment of the present invention includes an apparatus which can perform a beamforming with respect to a wireless signal transmitted to a counterpart wireless apparatus, consider the respective beamformed wireless signals as a single channel, and use one or more wireless channels at the same time.

Although the case of receiving data from two access points has been described above, the present invention is not limited thereto. For example, the wireless station may determine whether a difference value of signal levels of two or more access points is equal to or less than a preset value, and receive data from the two or more access points.

Figure 2:
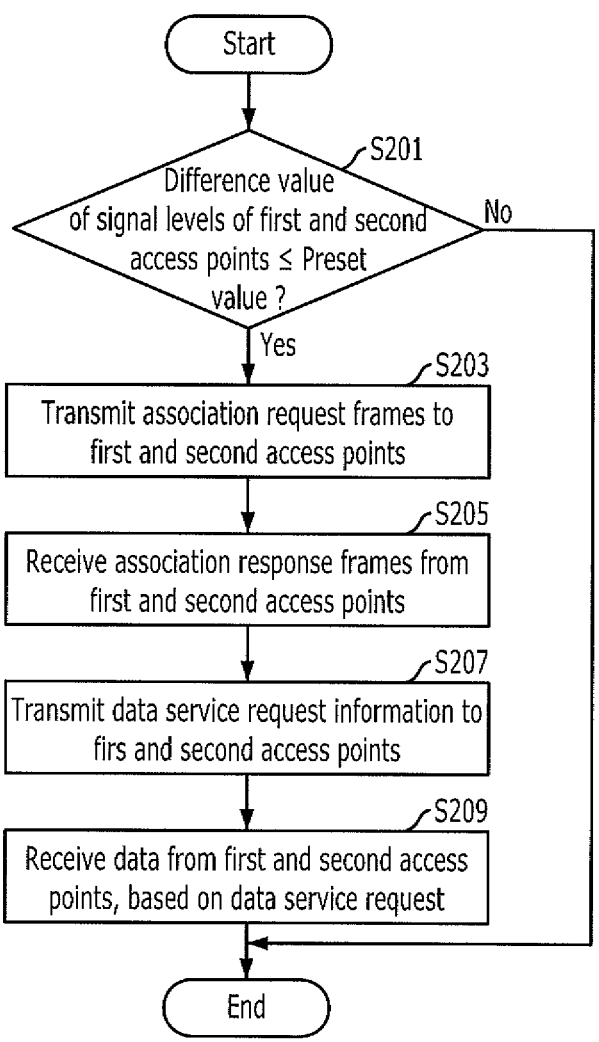
FIG. 2 illustrates a data receiving method using multiple channels in accordance with an embodiment of the present invention.

FIG. 2 illustrates a data receiving method using multiple channels in accordance with an embodiment of the present invention. As an embodiment of the present invention, a data receiving method of a wireless station will be described below with reference to FIG. 2. Specifically, a data receiving method of a wireless station, based on a MAC protocol, will be described below.

Referring to FIG. 2, the data receiving method in accordance with the embodiment of the present invention starts with step S201. A wireless station of FIG. 2 corresponds to the first wireless station 103 of FIG. 1.

At step S201, the wireless station determines whether a difference value of signal levels of first and second access points is equal to or less than a preset value. The wireless station may determine the signal levels from RSSI or SNR of the signals transmitted from the first and second access points. In this case, the wireless station may further determine whether the both the signal levels of the first and second access points are equal to or less than the preset value, and determine whether the wireless LAN service can be stably provided.

The wireless station transmits an association request frame to the first and second access points, depending on the determination result at the step S203. Specifically, when the difference value of the signal levels of the first and second access points is equal to or less than the preset value, the wireless station determines that interference between the signals of the first and second access points is small, and transmits the association request frame to the first and second access points.

At step S205, the wireless station receives association response frames from the first and second access points. By receiving the association response frames, the wireless station is associated with the first and second access points and receives data from the first and second access points. Since the wireless station receives data from the two access points, a VHT wireless LAN service is provided.

Meanwhile, the wireless station finds the access points in accordance with an active or passive scan scheme, and transmits an association request frame to the access points. The active scan scheme is a scheme in which the wireless station finds a beacon frame transmitted from the access point, and the passive scan scheme is a scheme in which the access point responds to a probe request frame transmitted from the wireless station by transmitting a probe response frame to the wireless station. At the step S201, the wireless station may determine the signal levels by using the beacon frame or the probe response frame transmitted from the access point.

The data receiving method in accordance with the embodiment of the present invention may further include steps S207 and S209.

At step S207, the wireless station associated with the first and second access points transmits service request information to the first and second access points. The wireless station may separate data constituting a single service, and request services to the first and second access points according to the separated data. Specifically, the wireless station may receive different data from the first and second access points and use a single service.

In this case, the wireless station may individually transmit the service request information to the first and second access points, depending on load information received from the first and second access points. Since QoS provided by the access points may be different depending on loads, the wireless station can request data to the access point by using the load information. For example, the wireless station may request low-capacity data, such as background traffic, to an access point of a high-load BSS, and may request high QoS data, such as audio or video data, to an access point of a low-load BSS. The load information may be included in the beacon frames transmitted from the first and second access points.

Meanwhile, the wireless station in accordance with the embodiment of the present invention may transmit QoS information to the first and second access points by using a control frame. Specifically, by transmitting the QoS information of the service to the access points, the wireless station may request data having satisfactory QoS to the access points and receive the data from the access points. In this case, the control or management frame may be an association request frame or an Add Traffic Stream (ADDTS) request frame. The ADDTS request frame is a management frame for MAC QoS control. That is, the wireless station may transmit the association request frame or the ADDTS request frame, which includes the QoS information, to the access points.

At step S209, the wireless station receives data from the first and second access points according to the service request. The wireless station may use the wireless LAN service by receiving data from the first and second access points.

The wireless station may determine whether an error occurs in the received data, and transmit service request information to the first or second access point according to the determination result. For example, when the wireless station requests the service to the first and second access points but does not normally receive data from the first access point because the signal level of the first access point is low, the wireless station may request the data, which is not received from the first access point, to the second access point. In this case, the wireless station may determine that an error occurs in the data, based on a preset standard.

That is, the data receiving method in accordance with the embodiment of the present invention may further include determining whether an error occurs in the data received from the first and second access points, and transmitting the service request information to the first or second access point according to the determination result.

In accordance with the embodiment of the present invention, the seamless service may be provided to the wireless station even when a hidden node problem occurs or the wireless station moves and thus a handover is required. As described above, for example, the wireless station may receive data from the second access point even when the wireless station moves and thus the signal level transmitted from the first access point is low.

Meanwhile, at this time, the wireless station may be associated with the first and second access points and transmit/receive data to/from the first and second access points. Alternatively, the wireless station may receive the signals of the first and second access points through a beamforming. In this case, different Modulation Coding Schemes (MCS) may be applied to the signals transmitted from the first and second access points according to the characteristics of the wireless station.

Figure 3:
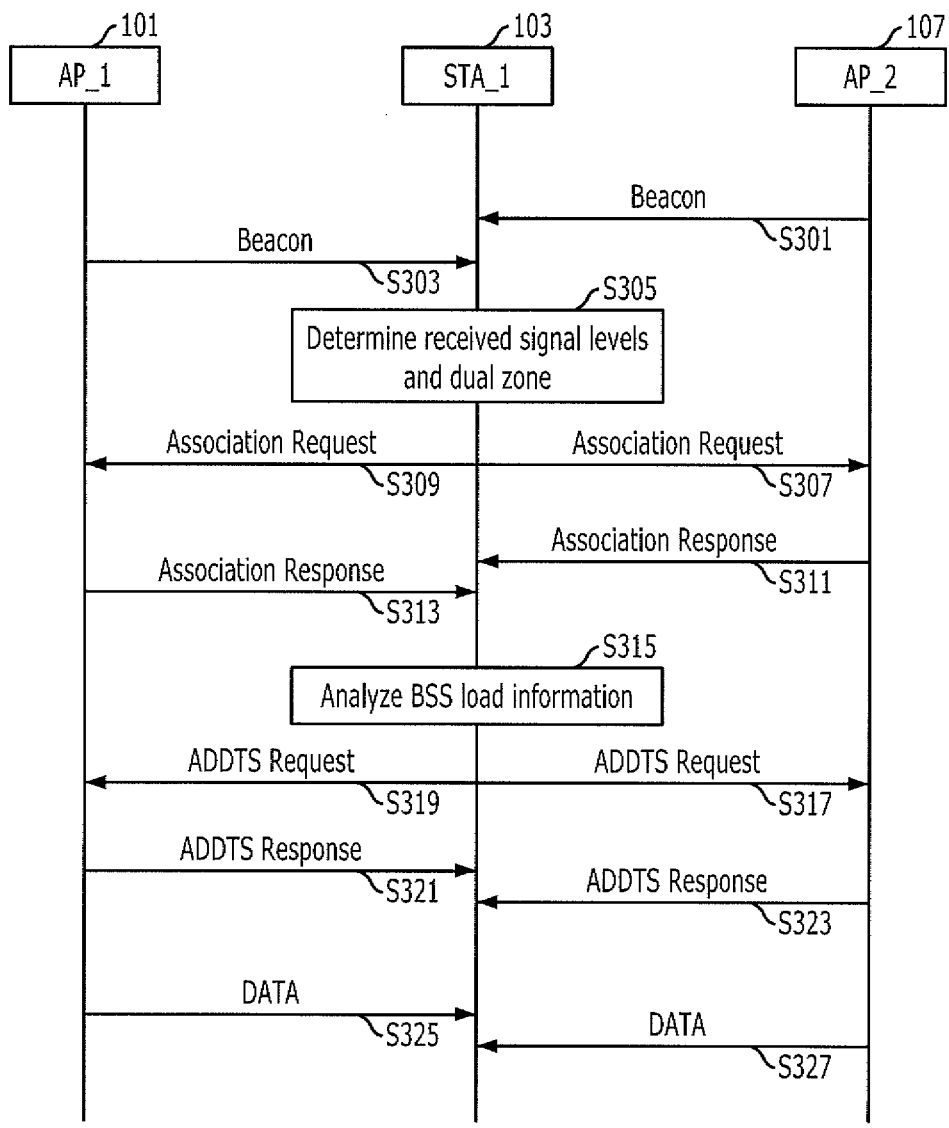
FIG. 3 illustrates the data receiving method of FIG. 2 in accordance with a specific embodiment of the present invention.

FIG. 3 illustrates the data receiving method of FIG. 2 in accordance with a specific embodiment of the present invention. A case where the first wireless station 103 finds the access point according to a passive scan scheme will be described below with reference to FIG. 3.

At steps S301 and S303, the first wireless station 103 receives beacon frames broadcasted from the first and second access points 101 and 107. At step S305, the first wireless station 103 having found the first and second access points 101 and 107 measure signal levels of the beacon frames broadcasted from the first and second access points 101 and 107, and determines whether it is located within the dual zone. When a difference of the signal levels of the beacon frames broadcasted from the first and second access points 101 and 107 is equal to or less than a preset value, the first wireless station 103 may determine that it is located within the dual zone.

At steps S307 and S309, when it is determined that the first wireless station 103 is located within the dual zone, the first wireless station 103 transmit association request frames to the first and second access points 101 and 107 in order for the association with the access points. In this case, the first wireless station 103 may determine a transmission time point by performing a random backoff. At steps S311 and S313, the first wireless station 103 receives association response frames from the first and second access points 101 and 107.

At step S315, after the completion of the association procedure, the first wireless station 103 may analyze BSS load information included in the beacon frames, and request data constituting the service to the first and second access points 101 and 107 according to the load information. At steps S317 and 319, the first wireless station 103 transmits ADDTS request frames, in which QoS information for service is included, to the first and second access points 101 and 107 in order for requesting the service on the basis of QoS. At steps S321 and 323, the first and second access points 101 and 107 transmit ADDTS response frames, in which available QoS information is included, to the first wireless station 103.

The first wireless station 103 receives the data from the first and second access points 101 and 107, based on the service request.

Figure 4:
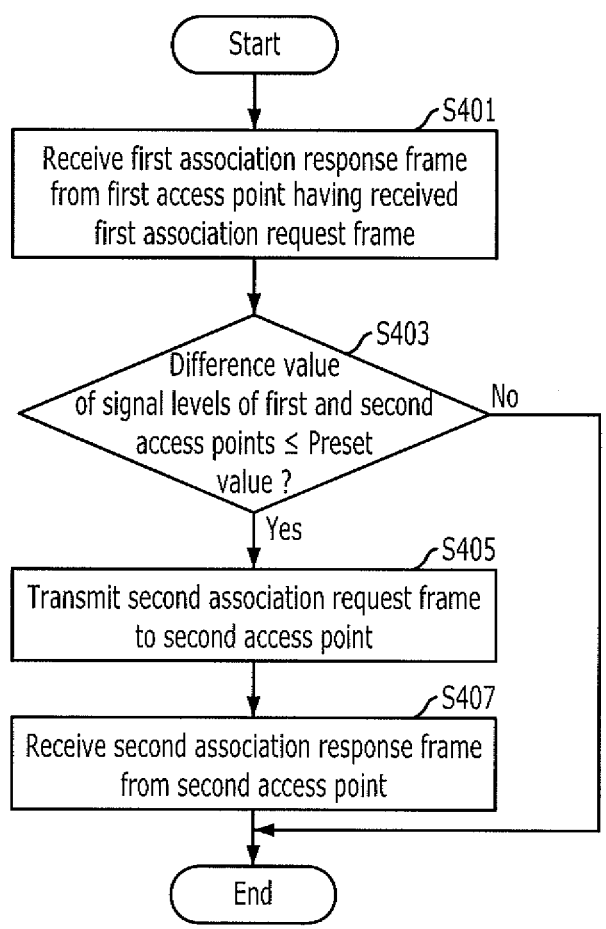
FIG. 4 illustrates a data receiving method using multiple channels in accordance with another embodiment of the present invention.

FIG. 4 illustrates a data receiving method using multiple channels in accordance with another embodiment of the present invention. As an embodiment of the present invention, a data receiving method of a wireless station will be described below with reference to FIG. 4. Specifically, like in FIG. 2, a data receiving method of a wireless station according to a MA protocol will be described. However, contrary to the data receiving method of FIG. 2, a method in which a wireless station is sequentially associated with the first and second access points and receives data from the first and second access points will be described as an embodiment of the present invention.

Referring to FIG. 4, the data receiving method in accordance with the embodiment of the present invention starts with step S401.

At step S401, the wireless terminal receives a first association response frame from a firs access point having received a firs association request frame. At step S403, the wireless station determines whether a difference value of signal levels of the first access point and a second access points is equal to or less than a preset value. At step S405, the wireless station transmits a second association request frame to the second access point. At step S407, the wireless station receives a second association response frame from the second access point.

That is, in accordance with the embodiment of the present invention, when the wireless station associated with the first access point moves to a dual zone, the wireless station may be additionally associated with the second access point and receive data from the second access point. In particular, since the wireless station is additionally associated with the second access point in such a state that the wireless station is associated with the first access point, the seamless service may be provided even when the wireless station is out of the dual zone and moves to a second BSS. Consequently, the wireless station may perform a seamless handover.

Figure 5:
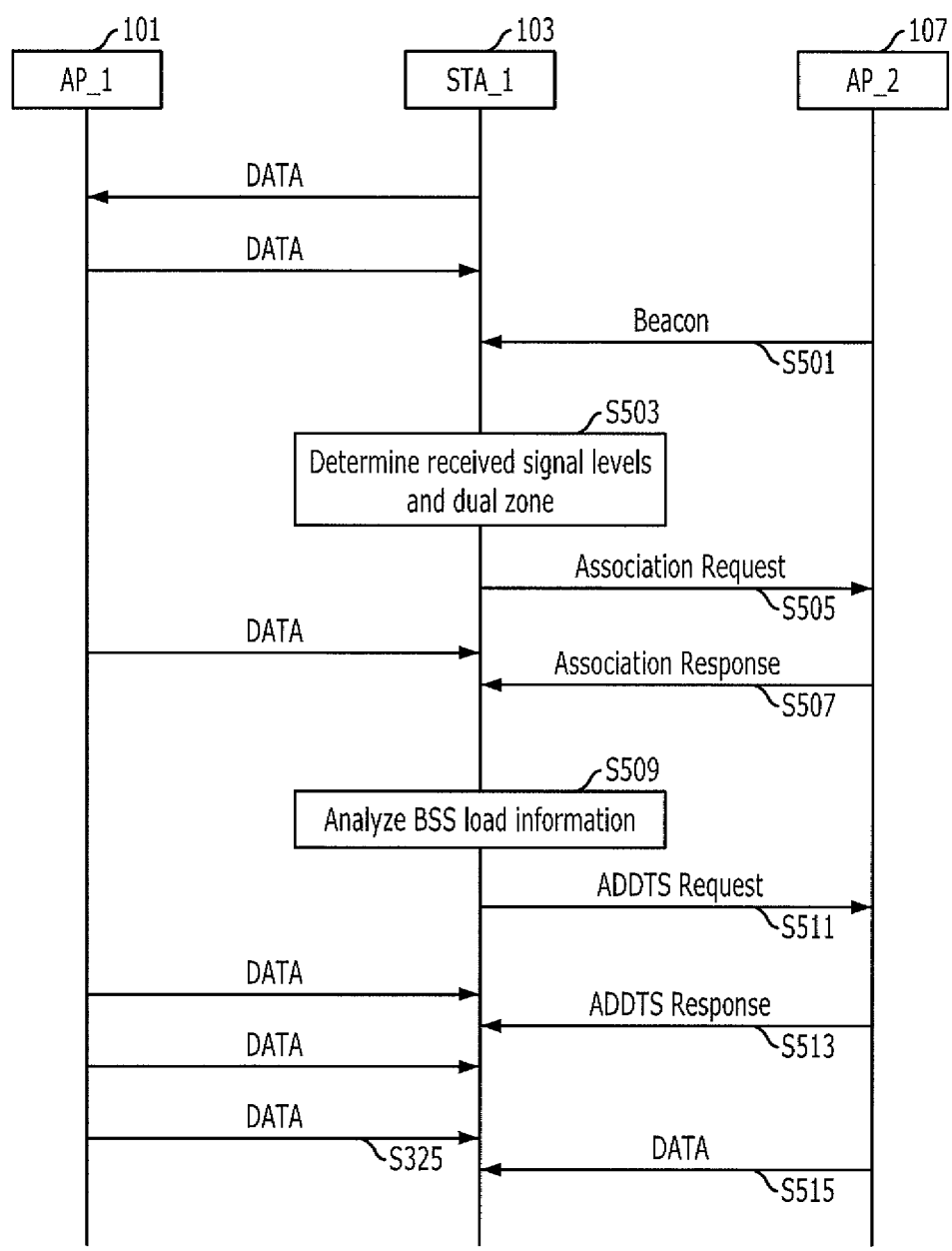
FIG. 5 illustrates the data receiving method of FIG. 4 in accordance with a specific embodiment of the present invention.

FIG. 5 illustrates the data receiving method of FIG. 4 in accordance with a specific embodiment of the present invention. Like in FIG. 3, a case where the first wireless station 103 finds the access point according to a passive scan scheme will be described below with reference to FIG. 5. Specifically, a case where the first wireless station 103 associated with the first access point 101 is additionally associated with the second access point 107 will be described as an embodiment of the present invention.

The first wireless station 103 associated with the first access point 101 transmits/receives uplink or downlink data for service to/from the first access point 101.

At step S501, the first wireless station 103 receives a beacon frame broadcasted from the second access point 107. At step S503, the wireless station 103 measures signal levels of the beacon frames, which are broadcasted from the first and second access points 101 and 107, and determines whether it is located within the dual zone. At step S505, when it is determined that the first wireless station 103 is located within the dual zone, the first wireless station 103 transmits an association request frame to the second access point 107, and receives an association response frame from the second access point 107.

At step S509, the first wireless station 103 may analyze BSS load information included in the beacon frame, and request a service to the second access point 107. At step S511, the first wireless station 103 transmits an ADDTS request frame, in which QoS information for service is included, to the second access point 107 in order for requesting the service on the basis of QoS. At step S513, the second access point 107 transmits an ADDTS response frame, in which available QoS information is included, to the first wireless station 103.

The first wireless station 103 receives the data from the second access point 107, based on the service request.

Meanwhile, in FIG. 5, when the first wireless station 103 associated with the first access point 101 transmits data such as the association request frame to the second access point 107, the first wireless station 103 may transmit a MAC Protocol Data Unit (MPDU) whose length is adjusted, considering the length of the data frame to be transmitted to the first access point 101. On the other hand, when data is transmitted/received through different frequency channels, data transmission/reception timing may not be synchronized, depending on characteristics of the system.

When the VHT wireless station in accordance with the embodiment of the present invention is associated with the first and second access points by using a beamforming, data transmission/reception synchronization with the first and second access points must be considered. To this end, a channel and NAV control operation of maintaining a virtual channel in an idle/busy state, a No ACK policy, and so on may be used.

Although the present invention has been described in terms of process, each step constituting the data receiving method in the wireless LAN system using multiple channels in accordance with the embodiments of the present invention can also be understood easily in terms of device. That is, the respective steps of the data receiving method in the wireless LAN system using multiple channels in accordance with the embodiments of the present invention may be understood as components of a data receiving apparatus, i.e., a wireless station, in the wireless LAN system using multiple channels in accordance with the principle of the present invention.

Specifically, a wireless station in accordance with an embodiment of the present invention includes: a control unit configured to determine whether a difference value of signal levels of first and second access points is equal to or less than a preset value; a transmission unit configured to transmit an association request frame to the first and second access points according to the determination result; and a reception unit configured to receive association response frames from the first and second access points.

Alternatively, a wireless station in accordance with another embodiment of the present invention includes: a first reception unit configured to receive a first association response frame from a first access point having received a first association request frame; a control unit configured to determine whether a difference value of signal levels of the first access point and a second access point is equal to or less than a preset value; a transmission unit configured to transmit a second association request frame to the second access point according to the determination result; and a second reception unit configured to receive a second association response frame from the second access point.

In accordance with the exemplary embodiments of the present invention, since the wireless station receives data from a plurality of access points, a VHT service may be provided to the wireless station, and a QoS may be improved.

Furthermore since the wireless station receives data from a plurality of access points, the service interruption during the movement of the wireless station may be prevented, and a hidden node problem may be solved.

The above-described methods can also be embodied as computer programs. Codes and code segments constituting the programs may be easily construed by computer programmers skilled in the art to which the invention pertains. Furthermore, the created programs may be stored in computer-readable recording media or data storage media and may be read out and executed by the computers. Examples of the computer-readable recording media include any computer-readable recoding media, e.g., intangible media such as carrier waves, as well as tangible media such as CD or DVD.

While the present invention has been described with respect to the specific embodiments, it will be apparent to those skilled in the art that various changes and modifications may be made without departing from the spirit and scope of the invention as defined in the following claims.

What is claimed is:

1. A data receiving method for a wireless station in a wireless LAN system using multiple channels, the data receiving method comprising:
    determining whether a difference value of signal levels of first and second access points is equal to or less than a preset value;
    transmitting an association request frame to the first and second access points according to the determination result;
    receiving association response frames from the first and second access points; and
    receiving data from both the first and second access points, wherein the wireless station is simultaneously associated with and receives data from
        the first access point included in a high load Basic Service Set and
        the second access point included in a low load Basic Service Set, and requests low capacity data from the first access point and high capacity data from the second access point.

2. The data receiving method of claim 1, further comprising:
    transmitting service request information to the first and second access points; and
    receiving data based on the service request from the first and second access points.

3. The data receiving method of claim 2, wherein the service request information is transmitted according to load information received from the first and second access points.

4. The data receiving method of claim 3, wherein the load information comprises information included in beacon frames of the first and second access points.

5. The data receiving method of claim 2, further comprising transmitting Quality of Service (QoS) information for service to the first and second access points by using a control frame.

6. The data receiving method of claim 5, wherein the control frame comprises an association request frame or an Add Traffic Stream (ADDTS) request frame.

7. The data receiving method of claim 2, further comprising:
    determining whether an error occurs in the data received from the first and second access points; and
    transmitting the service request information to the first or second access point according to the determination result.

8. A data receiving method for a wireless station in a wireless LAN system using multiple channels, the data receiving method comprising:
    receiving a first association response frame from a first access point having received a first association request frame;
    determining whether a difference value of signal levels of the first access point and a second access point is equal to or less than a preset value;
    transmitting a second association request frame to the second access point according to the determination result;
    receiving a second association response frame from the second access point; and
    receiving data from both a first and a second channel, wherein the wireless station is simultaneously associated with and receives data from the first access point included in a first high load Basic Service Set and the second access point included in a second low load Basic Service Set, and requests low capacity data from the first access point and high capacity data from the second access point.

9. The data receiving method of claim 8, wherein the first and second association response frames are transmitted from the first and second access points through different frequency channels, respectively.

10. The data receiving method of claim 8, further comprising:
    determining whether an error occurs in data received from the first and second access points; and
    transmitting service request information to the first or second access point according to the determination result.

11. The data receiving method of claim 8, wherein whether the difference value of the signal levels is equal to or less than the preset value is determined by using a received signal strength indication (RSSI) or signal-to-noise ratio (SNR) of signals transmitted from the first and second access points.

* * * * *